(12) United States Patent
Quan et al.

(10) Patent No.: US 8,952,666 B2
(45) Date of Patent: Feb. 10, 2015

(54) ENERGY ADJUSTOR FOR FUEL CELL GROUP

(75) Inventors: Shuhai Quan, Wuhan (CN); Liang Huang, Wuhan (CN); Ruiming Zhang, Wuhan (CN); Rui Quan, Wuhan (CN); Jin Quan, Wuhan (CN); Ying Xiong, Wuhan (CN); Qihong Chen, Wuhan (CN); Changjun Xie, Wuhan (CN); Cheng Zeng, Wuhan (CN); Bo Chen, Wuhan (CN)

(73) Assignees: Chung-Hsin Electric & Machinery Mfg. Corp., Taoyuan Hsien (TW); Wuhan Haixinneng Electric Limited Company, Wuhan (CN)

( * ) Notice: Subject to any disclaimer, the term of this patent is extended or adjusted under 35 U.S.C. 154(b) by 382 days.

(21) Appl. No.: 13/402,695

(22) Filed: Feb. 22, 2012

(65) Prior Publication Data

US 2013/0082531 A1 Apr. 4, 2013

(30) Foreign Application Priority Data

Sep. 29, 2011 (CN) .................. 2011 2 0378393 U (51) Int. Cl.
*H02J 7/00* (2006.01)
*H02M 3/155* (2006.01)
*H02J 7/34* (2006.01)
*H02J 1/00* (2006.01)

(52) U.S. Cl.
CPC ............... *H02J 7/00* (2013.01); *H02M 3/155* (2013.01); *H02J 7/34* (2013.01); *H02J 2001/004* (2013.01)
USPC .......................................................... 323/268

(58) Field of Classification Search
CPC ..... H02M 3/155; H02J 7/00; H02J 2001/004; G05F 1/00
USPC .................................. 323/268–272, 282, 284
See application file for complete search history.

(56) References Cited

U.S. PATENT DOCUMENTS 7,612,542 B2 * 11/2009 Eguchi et al. .................. 323/222
8,043,758 B2 * 10/2011 Noetzel et al. ................. 429/442

* cited by examiner

*Primary Examiner* — Adolf Berhane
*Assistant Examiner* — Yemane Mehari (57) ABSTRACT

An energy adjustor coupled between a fuel cell group and a secondary battery group is disclosed. A load is coupled to the secondary battery group in parallel. The energy adjustor includes a boost regulation module, a drop regulation module, a detecting module and a control module. The boost regulation module boosts an output voltage of the fuel cell group to generate a first adjustment voltage according to a first control signal. The drop regulation module drops the first adjustment voltage to generate a second adjustment voltage to the load according to a second control signal. The detecting module detects at least one of the fuel cell group, the boost regulation module, the drop regulation module and the load to generate a detection result. The control module generates the first and the second control signals according to the detection result.

6 Claims, 9 Drawing Sheets

FIG. 9

ENERGY ADJUSTOR FOR FUEL CELL GROUP

CROSS REFERENCE TO RELATED APPLICATIONS

This Application claims priority of China Patent Application No. 201120378393.1, filed on Sep. 29, 2011, the entirety of which is incorporated by reference herein.

BACKGROUND OF THE INVENTION

1. Field of the Invention

The invention relates to an energy adjustor, and more particularly to an energy adjustor method for a fuel cell group.

2. Description of the Related Art

Given the decrease of non-renewable energy sources, it is important to develop new energy sources. Fuel cells are new energy sources. The environment is not contaminated by the fuel cells. The fuel cells have high efficiency. Thus, the fuel cells can solve the difficult problem of energy deficiency in the world. The transforming efficiency of the fuel cells is high and the environment is not contaminated by the fuel cells. The size of the fuel cells is small and the fuel cells can be conveniently utilized in any place.

However, fuel cells cannot continuously output a stable voltage. Generally, when fuel cells output large currents, the voltage of the fuel cells is reduced. Thus, the voltage range of the fuel cells is wide and exceeds the working range of an electric appliance. Furthermore, the response of the fuel cells is not good. Since the fuel cells are easily affected upon a chemical reaction, the fuel cells have a time delay problem. When a load driven by the fuel cells is frequently turned on or turned off or the load is temporary driven, if the fuel cells cannot provide power to the load, the loading of the fuel cells is too heavy. Thus, the efficiency of the fuel cells is obviously reduced.

Thus, the fuel cells are applied with a power converter to adjust, control and manage the power provided by the fuel cells. For the fuel cells, the power converter is an important issue and relates to quality, safety and reliability of a power system utilizing the fuel cells.

However, a conventional power converter utilizes switches to switch the output power of the fuel cells to drive a load. No device adjusts the property of the fuel cells. Additionally, the input voltage range of the conventional power converter is narrow. Thus, the conventional power converter only receives a narrow input voltage and cannot match the fuel cells with large output voltage ranges.

In addition, the output voltage of the conventional power converter is fixed and converting efficiency, accuracy and stability of the conventional power converter are low. Thus, the conventional power converter cannot accurately and quickly control the output of the fuel cells.

BRIEF SUMMARY OF THE INVENTION

An energy adjustor is provided to adjust an output power of a fuel cell group. The energy adjustor can process input voltage within a large range and output controllable power (e.g. voltage, current or power). The energy adjustor can posse the favorable advantages of high efficiency and reliability.

An exemplary embodiment of an energy adjustor coupled between a fuel cell group and a secondary battery group, wherein a load is coupled to the secondary battery group in parallel, comprises a boost regulation module, a drop regulation module, a detecting module and a control module. The boost regulation module boosts an output voltage of the fuel cell group to generate a first adjustment voltage according to a first control signal. The drop regulation module drops the first adjustment voltage to generate a second adjustment voltage to the load according to a second control signal. The detecting module detects at least one of the fuel cell group, the boost regulation module, the drop regulation module and the load to generate a detection result. The control module generates the first and the second control signals according to the detection result.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
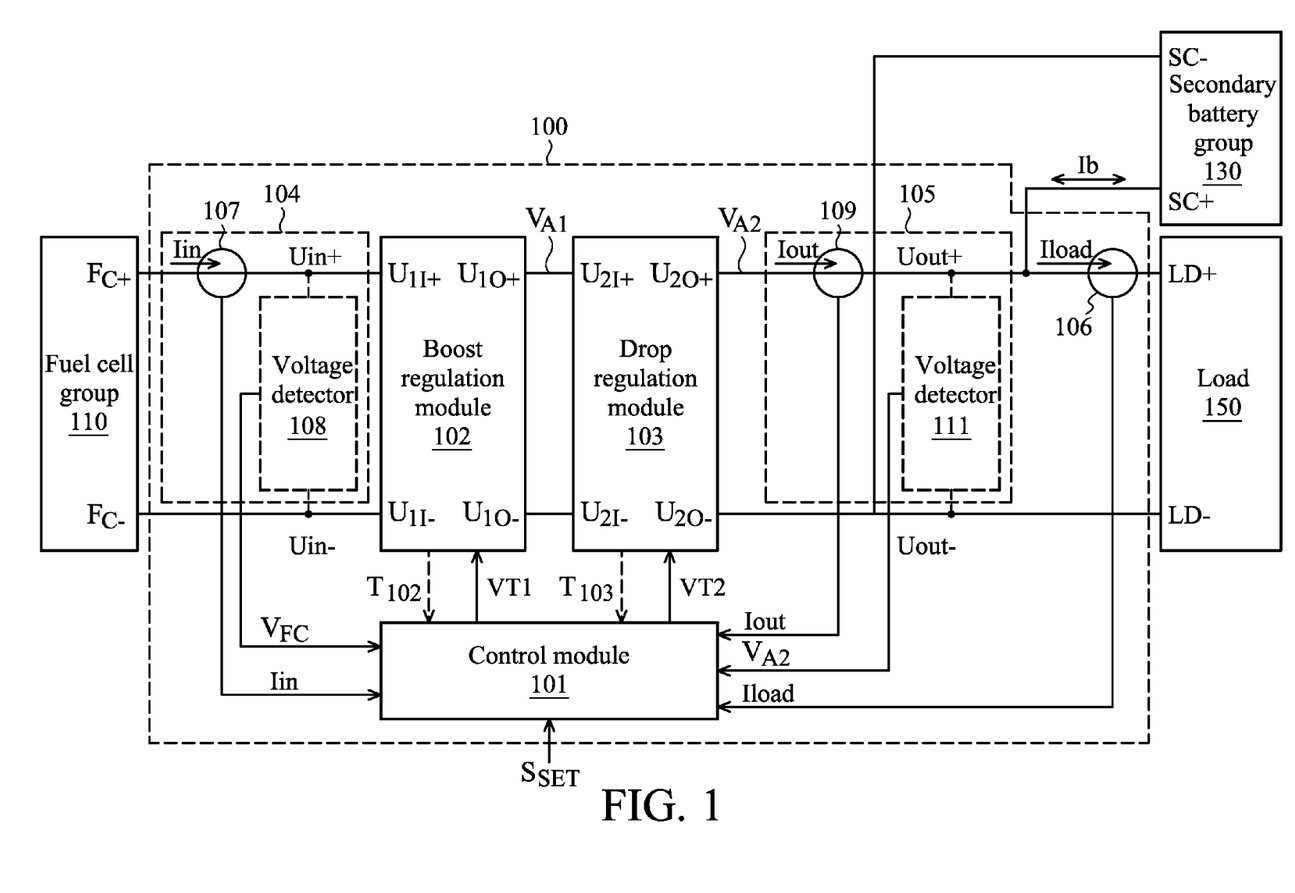
FIG. 1 is a schematic diagram of an exemplary embodiment of an energy adjustor.

FIG. 1 is a schematic diagram of an exemplary embodiment of an energy adjustor. The energy adjustor 100 is coupled between a fuel cell group 110 and a secondary battery group 130 to distribute energies provided by the fuel cell group 110 and the secondary battery group 130. A load 150 is parallel with the secondary battery group 130.

In this embodiment, the energy adjustor 100 comprises a control module 101, a boost regulation module 102, a drop regulation module 103 and a detecting module. The detecting module detects at least one of the fuel cell group 110, the boost regulation module 102, the drop regulation module 103 and the load 150 and generates a detection result. The control module 101 generates control signals VT1 and VT2 according to the detection result generated by the detecting module.

The boost regulation module 102 and the drop regulation module 103 transforms the output power of the fuel cell group 110 according to the control signals VT1 and VT2, respectively. Thus, the output power of the fuel cell group 110 can be processed according to a two-stage transformation technique even if the output power of the fuel cell group 110 is within a large range. In this embodiment, the boost regulation module 102 boosts the voltage $V_{FC}$ of the fuel cell group 110 to generate an adjustment voltage $V_{A1}$ according to the control signal VT1. The invention does not limit the circuit structure of the boost regulation module 102. Any circuit can serve as the boost regulation module 102, as long as the circuit is capable of boosting voltage.

The drop regulation module 103 drops the adjustment voltage $V_{A1}$ to generate another adjustment voltage $V_{A2}$ according to the control signal VT2. The adjustment voltage $V_{A2}$ is provided to the load 150 and the secondary battery group 130. The invention does not limit the circuit structure of the drop regulation module 103. Any circuit can serve as the drop regulation module 103, as long as the circuit is capable of dropping voltage.

In this embodiment, the positive pole FC+ of the fuel cell group 110 is coupled to the input terminal $U_{1I+}$ of the boost regulation module 102. The negative pole FC− is coupled to the input terminal $U_{1I-}$ of the boost regulation module 102. The input terminal $U_{2I+}$ of the drop regulation module 103 is coupled to the output terminal $U_{1O+}$ of the boost regulation module 102. The input terminal $U_{2I-}$ of the drop regulation module 103 is coupled to the output terminal $U_{1O-}$ of the boost regulation module 102. The output terminal $U_{2O+}$ of the drop regulation module 103 is coupled to the positive pole SC+ of the secondary battery group 130. The output terminal $U_{2O-}$ of the drop regulation module 103 is coupled to the negative pole SC− of the secondary battery group 130. The positive pole SC+ of the secondary battery group 130 is coupled to the positive pole LD+ of the load 150. The negative pole SC− of the secondary battery group 130 is coupled to the negative pole LD− of the load 150. In one embodiment, the terminals Uin−, $U_{1I-}$, $U_{1O-}$, $U_{2I-}$, $U_{2O-}$ and Uout− receive the same voltage, such as a ground voltage.

The detecting module comprises detecting units 104~106 to detect the stages (e.g. voltage stage, current stage and power stage) of the fuel cell group 110, the drop regulation module 103 and the load 150. In other embodiments, the boost regulation module 102 comprises the detecting unit 230 shown in FIG. 2, and the drop regulation module 103 comprises the detecting unit 330 shown in FIG. 3. The detecting unit 230 detects the temperature of the boost regulation module 102, and the detecting unit 330 detects the temperature of the drop regulation module 103.

The detecting unit 104 comprises a current detector 107 and a voltage detector 108. The current detector 107 is coupled to the positive pole FC+ of the fuel cell group 110 to detect the output current Iin of the fuel cell group 110. The voltage detector 108 is coupled between the nodes Uin+ and Uin− to detect the output voltage $V_{FC}$ of the fuel cell group 110.

The detecting unit 105 comprises a current detector 109 and a voltage detector 111. The current detector 109 is coupled to the output terminal $U_{2O+}$ of the drop regulation module 103 to detect the current flowing pass the output terminal $U_{2O+}$. The voltage detector 111 is coupled to the nodes Uout+ and Uout− to detect the adjustment voltage $V_{A2}$ generated by the drop regulation module 103.

In this embodiment, the detecting unit 106 is a current detector coupled to the positive pole LD+ of the load 150 to detect a requirement current Iload required by the load 150. In this embodiment, it is determined that the secondary battery group 130 is charged or discharged according to the detection results of the detecting unit 106 and the current detector 109.

For example, when Iload−Iout>0, it represents that the fuel cell group 110 and the secondary battery group 130 are discharged. In one embodiment, a setting signal $S_{SET}$ is utilized to define energies provided by the fuel cell group 110 and the secondary battery group 130. When Iload−Iout=0, it represents that the secondary battery group 130 is not charged and not discharged. At this time, the energy required by the load 150 is provided by the fuel cell group 110. When Iload−Iout<0, it represents that the fuel cell group 110 not only drives the load 150, but also charges the secondary battery group 130. The energy adjustor 100 charges or discharges the secondary battery group 130 according to state of charge (SOC) of the secondary battery group 130. In one embodiment, the energy adjustor 100 provides the same voltage or the same current to charge the secondary battery group 130.

In this embodiment, the control module 101 generates control signals VT1 and VT2 according to the detection result generated by the detecting module. The invention does not limit the kind of the control signals VT1 and VT2. In one embodiment, the control signals VT1 and VT2 are pulse width modulation (PWM) signals.

In another embodiment, the control module 101 further considers a setting signal $S_{SET}$ to generate the control signals VT1 and VT2. For example, if the setting signal $S_{SET}$ is a voltage indicative value sent by a user, the control module 101 generates the corresponding control signals VT1 and VT2 according to the setting signal $S_{SET}$ such that the boost regulation module 102 and the drop regulation module 103 appropriately transform the output voltage $V_{FC}$ of the fuel cell group 110. In one embodiment, the adjustment voltage $V_{A2}$ is equal to the voltage indicative value.

Similarly, if the setting signal $S_{SET}$ is a current indicative value or a power indicative value sent by a user, the control module 101 simultaneously controls the boost regulation module 102 and the drop regulation module 103 such that the output current or the output power of the fuel cell group 110 is equal to the current indicative value or the power indicative value.

If the setting signal $S_{SET}$ is a following signal sent by a user, the control module 101 calculates a requirement power required by the load 150 and controls the boost regulation module 102 and the drop regulation module 103 such that the output power of the fuel cell group 110 is equal to the requirement power required by the load 150. At this time, the secondary battery group 130 is not charged and not discharged.

Figure 2:
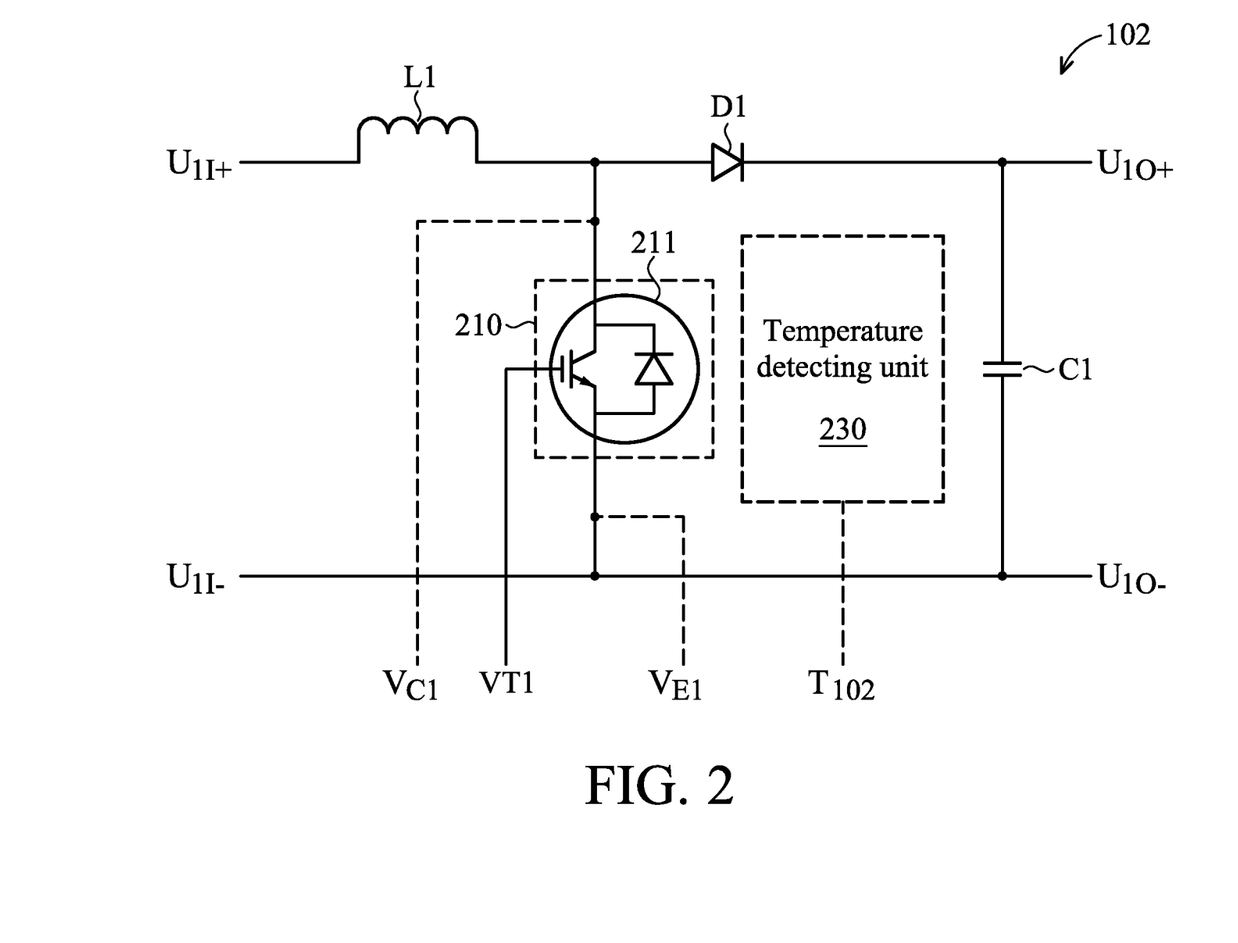
FIG. 2 is a schematic diagram of an exemplary embodiment of the boost regulation module.

FIG. 2 is a schematic diagram of an exemplary embodiment of the boost regulation module. In this embodiment, the boost regulation module 102 is a boost chopper circuit to increase the output voltage $V_{FC}$ of the fuel cell group 110 to a pre-determined level. In this embodiment, the boost regulation module 102 boosts the output voltage $V_{FC}$ of the fuel cell group 110 from 29V-76V to 65V-76V.

As shown in FIG. 2, the boost regulation module 102 comprises an inductor L1, a diode D1, a switch 210, a capacitor C1. The inductor L1 is coupled to the positive pole FC+ of the fuel cell group 110 via the input terminal $U_{1I+}$. The diode D1 is coupled between the inductor L1 and the output terminal $U_{1O+}$. The capacitor C1 is coupled between the output terminals $U_{1O+}$ and $U_{1O-}$. The switch 210 receives the control signal VT1 and is coupled to the inductor L1 and the negative pole FC− of the fuel cell group 110.

In this embodiment, the switch 210 is an Insulated Gate Bipolar Transistor (IGBT) 211, but the disclosure is not limited thereto. As shown in FIG. 2, the gate of the IGBT 211 receives the control signal VT1. The collector of the IGBT 211 is coupled to the anode of the diode D1. The emitter of the IGBT 211 is coupled to the negative pole FC− of the fuel cell group 110 via the input terminal $U_{1I-}$.

In other embodiments, the collector voltage $V_{C1}$ and the emitter voltage $V_{E1}$ of the IGBT 211 are provided to the control module 101 to determine whether the IGBT 211 is normal. When the IGBT 211 is abnormal, warning information is issued.

The boost regulation module 102 comprises a temperature detecting unit 230. The temperature detecting unit 230 detects the temperature of the switch 210 and generates a detection result $T_{102}$ to the control module 101.

Figure 3:
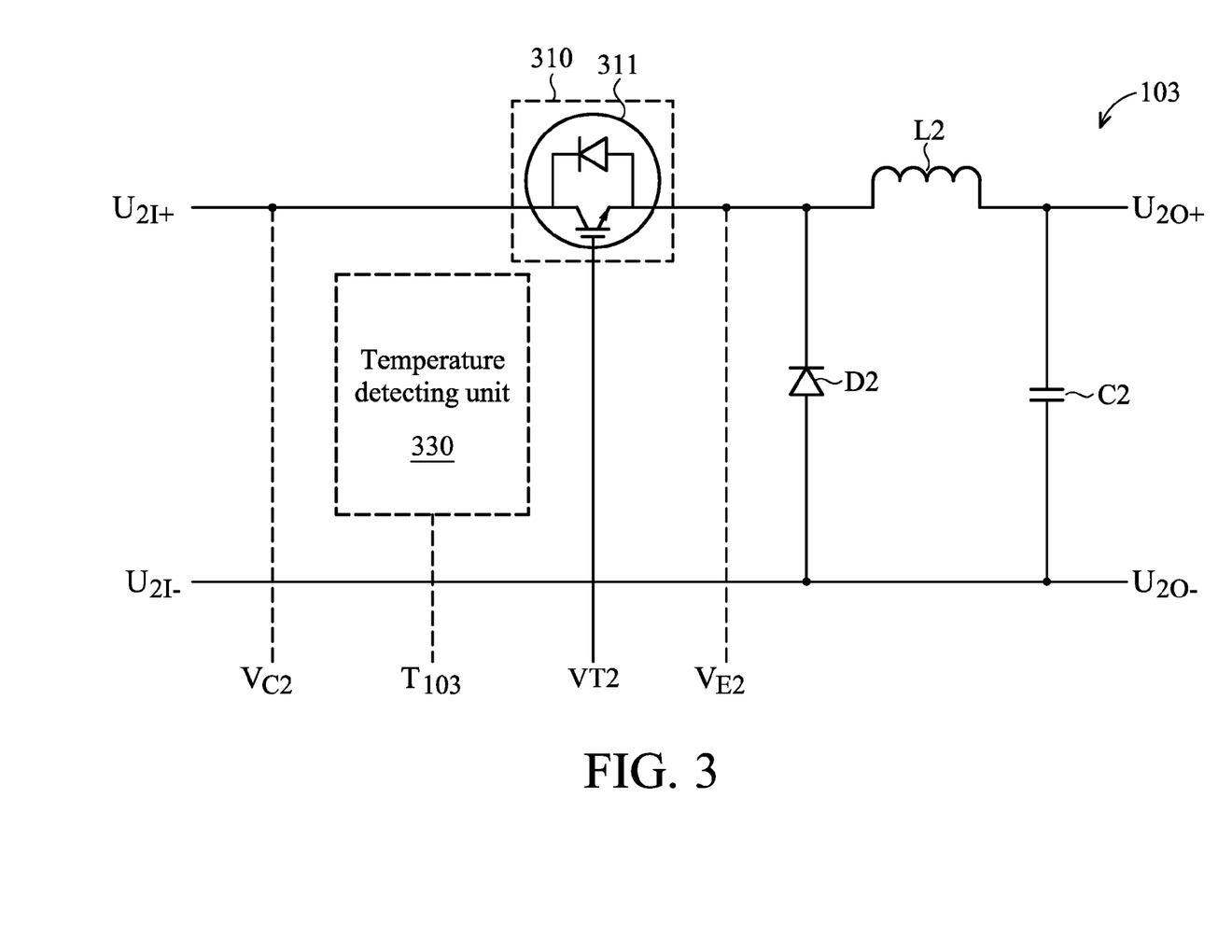
FIG. 3 is a schematic diagram of an exemplary embodiment of the drop regulation module.

FIG. 3 is a schematic diagram of an exemplary embodiment of the drop regulation module. In this embodiment, the drop regulation module 103 is a drop chopper circuit to reduce the adjustment voltage $V_{A1}$ generated by the boost regulation module 102 to a controllable level, such as the adjustment voltage $V_{A2}$. In this embodiment, the drop regulation module 103 reduces the adjustment voltage $V_{A1}$ generated by the boost regulation module 102 from 65V-76V to 43V-58V set by a user.

The drop regulation module 103 comprises a switch 310, an inductor L2, a diode D2, a capacitor C2. The switch 310 receives the control signal VT2 and is coupled to the input terminal $U_{2I+}$. The inductor L2 is coupled between the switch 310 and the output terminal $U_{2O+}$. The diode D2 is coupled between the inductor D2 and the output terminal $U_{2O-}$. The capacitor C2 is coupled between the output terminals $U_{2O+}$ and $U_{2O-}$.

In this embodiment, the switch 310 is an IGBT 311, but the disclosure is not limited thereto. The gate of the IGBT 311 receives the control signal VT2. The collector of the IGBT 311 is coupled to the input terminal $U_{2I+}$. The emitter of the IGBT 311 is coupled to the inductor L2. In other embodiments, the collector voltage $V_{C2}$ and the emitter voltage $V_{E2}$ of the IGBT 311 are provided to the control module 101 to determine whether the IGBT 311 is normal. When the IGBT 311 is abnormal, the control module 101 issues warning information.

In FIG. 3, the drop regulation module 103 comprises a temperature detecting unit 330. The temperature detecting unit 330 detects the temperature of the switch 310 and generates a detection result $T_{103}$ to the control module 101.

Figure 4:
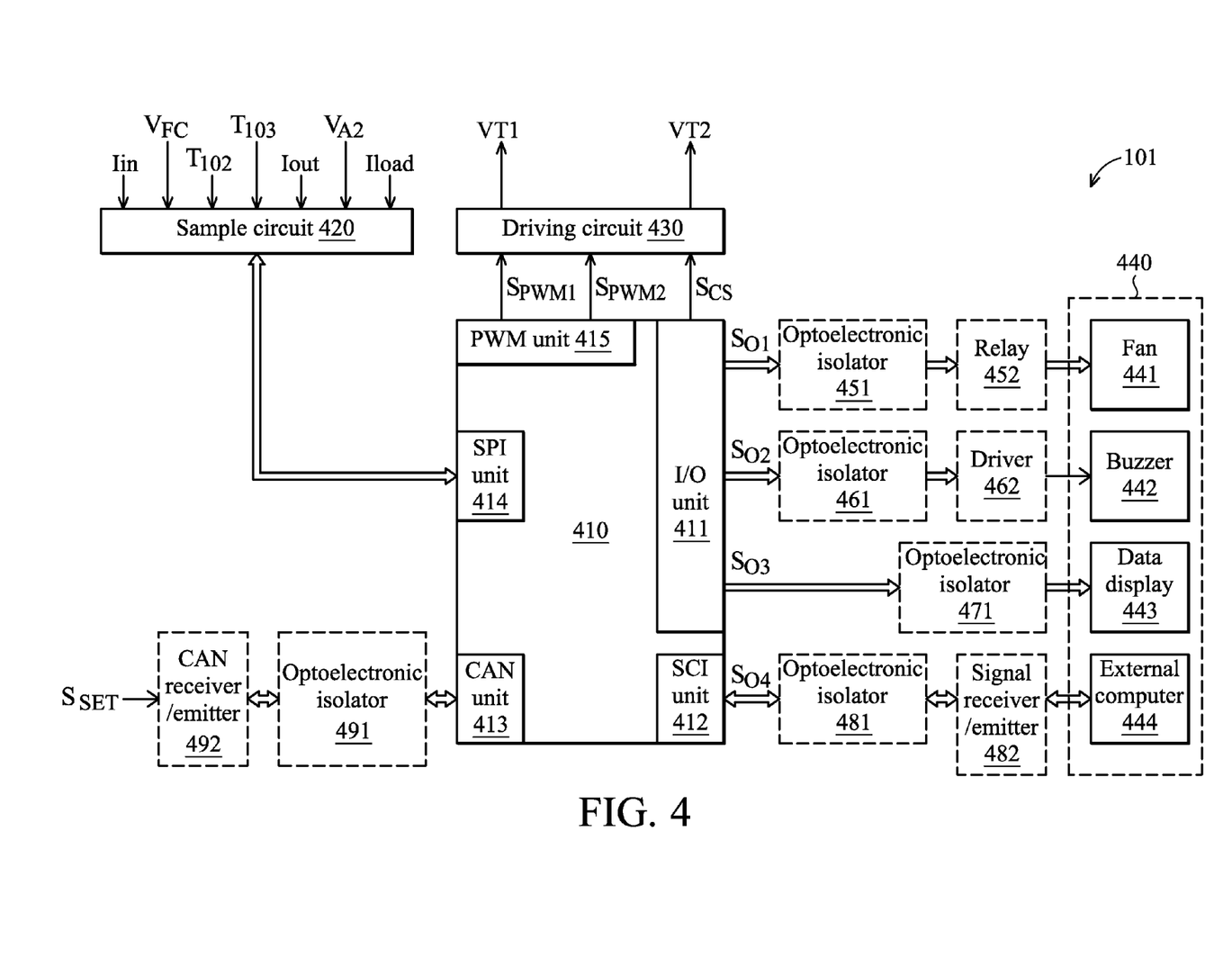
FIG. 4 is a schematic diagram of an exemplary embodiment of the control module.

FIG. 4 is a schematic diagram of an exemplary embodiment of the control module. The control module 101 comprises a micro-controller 410, a sample circuit 420, and a driving circuit 430. In one embodiment, the micro-controller 410 is a DSP chip TMS320LF2407 fabricated by TI, but the disclosure is not limited thereto.

The sample circuit 420 samples at least one of the detection results generated by the detecting units 104~106, 210 and 310. In one embodiment, the sample circuit 420 is an analog-to-digital (A/D) sampling circuit. The A/D sampling circuit immediately collects at least one of the detection results (e.g. $V_{FC}, V_{A2}$, Iin, Iout, Iload, $T_{102}, T_{103}$) generated by the detecting units, filters the collected detected result and then transforms the filtered result from an analog format to a digital format. The transformed result is transmitted to the micro-controller 410 via a serial peripheral interface (SPI) bus.

The micro-controller 410 comprises an SPI unit 414 to receive the output of the sample circuit 420. In other embodiments, if the sample circuit 420 outputs a signal via other interfaces, the micro-controller 410 utilizes other transmission interfaces to receive the output signal of the sample circuit 420.

In this embodiment, the micro-controller 410 comprises a PWM unit 415. The PWM unit 415 generates PWM signals $S_{PWM1}, S_{PWM2}$ and an activation signal $S_{CS}$ according to the output of the sample circuit 420. The driving circuit 430 generates the control signals VT1 and VT2 according to the PWM signals $S_{PWM1}, S_{PWM2}$ and the activation signal $S_{CS}$. Thus, the boost regulation module 102 and the drop regulation module 103 are simultaneously activated.

In this embodiment, since the switches (e.g. 210 and 310) of the boost regulation module 102 and the drop regulation module 103 are IGBTs, the driving circuit 430 is an IGBT driving circuit, but the disclosure is not limited thereto. In some embodiments, if the switches (210 and 310) of the boost regulation module 102 and the drop regulation module 103 are other switches, the driving circuit 430 is a corresponding circuit to drive the switches.

As shown in FIG. 4, the control module 101 further comprises a peripheral unit 440. The micro-controller 410 controls the peripheral unit 440 according to the output of the sample circuit 420 such that the peripheral unit 440 executes a corresponding operation. For example, the peripheral unit 440 notifies a current working state or a fault state, diagnoses a fault or executes a remote monitor function. In this embodiment, the peripheral unit 440 comprises a fan 441, a buzzer 442, a data display 443 and an external circuit 444, but the disclosure is not limited thereto.

The micro-controller 410 generates an output signal $S_{O1}$ according to the output of the sample circuit 420 and provides the output signal $S_{O1}$ to the fan 441 via an input/output (I/O) unit 411. In this embodiment, the control module 101 further comprises an optoelectronic isolator 451 and a relay 452. The optoelectronic isolator 451 is coupled to the micro-controller 410 and receives the output signal $S_{O1}$. The relay 452 is coupled between the optoelectronic isolator 451 and the fan 441 and controls the operation of the fan 441 according to the output signal $S_{O1}$.

In another embodiment, the micro-controller 410 generates an output signal $S_{O2}$ according to the output of the sample circuit 420 and provides the output signal $S_{O2}$ to the buzzer 442 via the I/O unit 411. In this embodiment, the control module 101 further comprises an optoelectronic isolator 461 and a driver 462. The optoelectronic isolator 461 is coupled to the micro-controller 410 and receives the output signal $S_{O2}$. The driver 462 is coupled between the optoelectronic isolator 461 and the buzzer 442 and drives the buzzer 442 according to the output signal $S_{O2}$.

Additionally, the micro-controller 410 generates an output signal $S_{O3}$ according to the output of the sample circuit 420 and provides the output signal $S_{O3}$ to the data display 443 via the I/O unit 411. In this embodiment, the control module 101 further comprises an optoelectronic isolator 471. The optoelectronic isolator 471 is coupled to the micro-controller 410 to drive the data display 443 according to the output signal $S_{O3}$.

In one embodiment, the data display 443 displays a fault code according to the output signal $S_{O3}$. A user executes a service action according to the fault code. In other embodiments, the data display 443 can display the operation state (e.g. the voltage states, the current states or the power states) of the fuel cell group 110, the secondary battery group 130 or the load 150.

The micro-controller 410 generates an output signal $S_{O4}$ according to the output of the sample circuit 420. In this embodiment, the micro-controller 410 provides the output signal $S_{O4}$ to the peripheral unit 440 via a serial communications interface (SCI) unit 412. For example, the micro-controller 410 comprises an RS-482 interface or an RS-232 interface to communicate with the peripheral unit 440. In another embodiment, the micro-controller 410 communicates with the peripheral unit 440 by an external RS-485 converter or an RS-232 converter. In some embodiments, the micro-controller 410 communicates with the peripheral unit 440 by other interface.

In this embodiment, the control module 101 comprises an optoelectronic isolator 481 and a signal receiver/emitter 482. The optoelectronic isolator 481 is coupled to the micro-controller 410 and receives the output signal $S_{O4}$. The signal receiver/emitter 482 is coupled between the optoelectronic isolator 481 and an external computer 444. Thus, the micro-controller 410 communicates with the external computer 444 via the signal receiver/emitter 482. In one embodiment, the signal receiver/emitter 482 is an RS-485 receiver/emitter or an RS-232 receiver/emitter.

Furthermore, the micro-controller 410 generates the corresponding signals (e.g. $S_{PWM1}$, $S_{PWM2}$, $S_{CS}$, $S_{O1}$~$S_{O4}$) according to at least one of the detection result generated by detecting units. The micro-controller 410 also generates the corresponding signals to control the output voltage, the output current and the power of the fuel cell group 110 according to a setting signal $S_{SET}$.

In one embodiment, a CAN interface is utilized between the control module 101 and a user interface. Thus, the control module 101 can control the operation state (e.g. the voltage states, the current states and the power states) of the fuel cell group 110, the secondary battery group 130 and the load 150 according to the set of the user.

In this embodiment, the micro-controller 410 comprises a CAN unit 413 to receive a setting signal $S_{SET}$, but the disclosure is not limited thereto. In other embodiments, the micro-controller 410 utilizes other interface to receive the setting signal $S_{SET}$. The CAN unit 412 receives the setting signal $S_{SET}$ via an optoelectronic isolator 491 and a CAN receiver/emitter 492.

Since each of the boost regulation module 102, the drop regulation module 103, the control module 101 with a CAN bus, and the micro-controller 410 is modularized and respectively controlled, a user can easily utilize the energy adjustor 100. Furthermore, the output power of the energy adjustor 100 can reach 6 KW.

Figure 5:
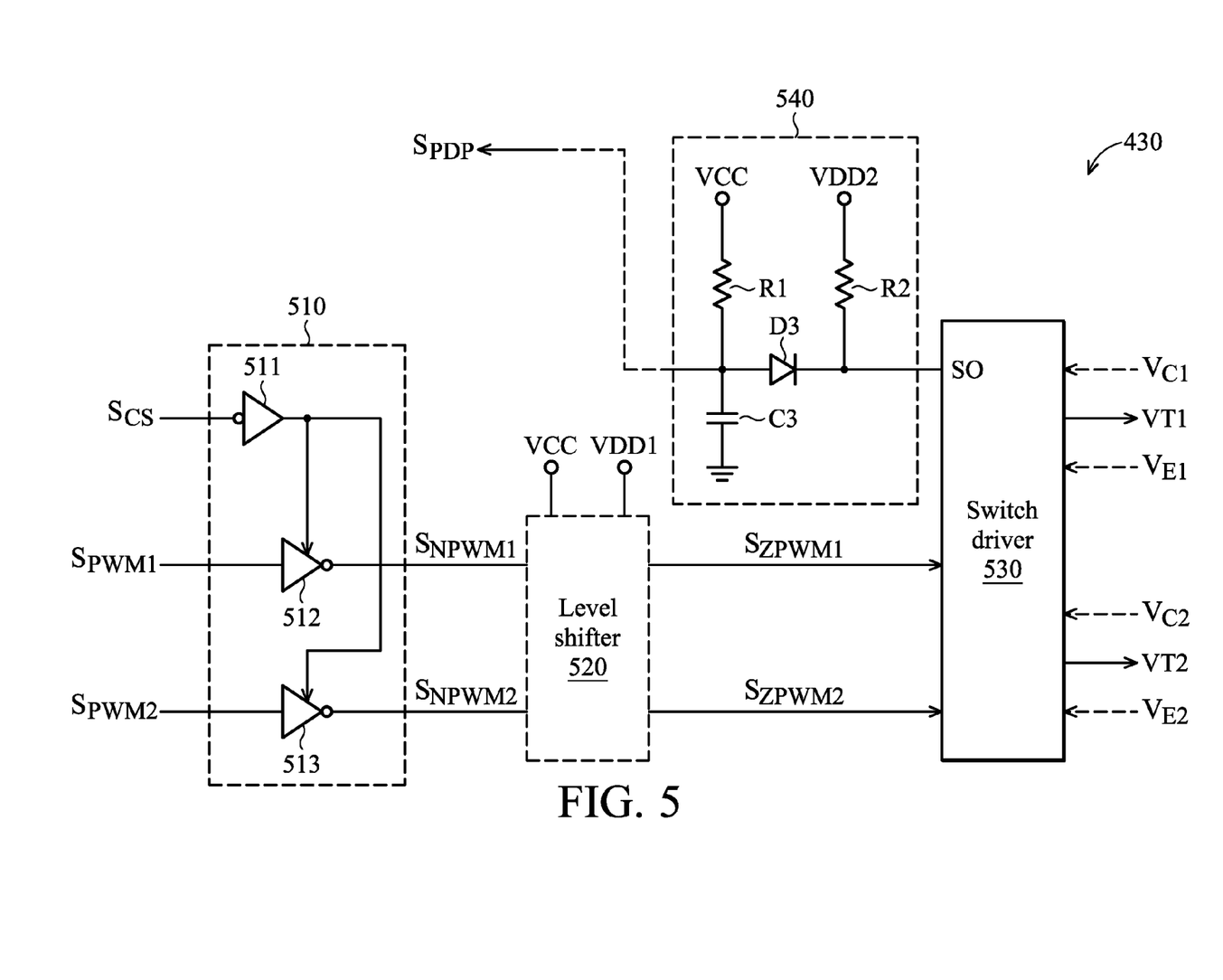
FIG. 5 is a schematic diagram of an exemplary embodiment of the driving circuit.

FIG. 5 is a schematic diagram of an exemplary embodiment of the driving circuit. The driving circuit 430 comprises an inverting driver 510, a level shifter 520 and a switch driver 530. The inverting driver 510 processes the PWM signals $S_{PWM1}$ and $S_{PWM2}$ to generate an inverting signal $S_{NPWM1}$ and $S_{NPWM2}$ according to the activation signal $S_{CS}$. In this embodiment, the inverting driver 510 comprises drivers 511~513. The driver 511 activates the drivers 512 and 513 according to the activation signal $S_{CS}$. Thus, the driver 512 generates the inverting signal $S_{NPWM1}$ according to the PWM signal $S_{PWM1}$ and the driver 513 generates the inverting signal $S_{NPWM2}$ according to the PWM signal $S_{PWM2}$.

The level shifter 520 transforms the levels of the inverting signal $S_{NPWM1}$ and $S_{NPWM2}$ to generate transformation signals $S_{ZPWM1}$ and $S_{ZPWM2}$. In this embodiment, the level shifter 520 transforms the levels of the inverting signal $S_{NPWM1}$ and $S_{NPWM2}$ from VCC (e.g. 3.3V) to VDD1 (e.g. 5V). Thus, the levels of the transformation signals $S_{ZPWM1}$ and $S_{ZPWM2}$ are equal to VDD1.

However, if the levels of the inverting signal $S_{NPWM1}$ and $S_{NPWM2}$ are equal to 5V, the level shifter 520 can be omitted. In some embodiments, the level shifter 520 is a chip for the 744245 series.

The switch driver 530 generates control signals VT1 and VT2 according to the output (e.g. the transformation signals $S_{ZPWM1}$ and $S_{ZPWM2}$) of the level shifter 520. If the levels of the inverting signal $S_{NPWM1}$ and $S_{NPWM2}$ are not required to be transformed, the switch driver 530 generates control signals VT1 and VT2 according to the inverting signal $S_{NPWM1}$ and $S_{NPWM2}$. In one embodiment, the switch driver 530 is a chip, such as 2SC0435T.

In this embodiment, the switch driver 530 can detect a fault. As shown in FIG. 5, the switch driver 530 receives the voltages $V_{E1}$ and $V_{C1}$ of the IGBT 211 of the boost regulation module 102 and the voltages $V_{E2}$ and $V_{C2}$ of the IGBT 311 of the drop regulation module 103 to determine whether the IGBT 211 or 311 is abnormal.

For example, when the IGBT 211 or 311 is abnormal, the switch driver 530 sends an interruption signal $S_{PDP}$ such that a software stored in the micro-controller 410 executes a fault processing procedure. In this embodiment, when the IGBT 211 or 311 is abnormal, a pin SO of the switch driver 530 is at a low level. Thus, the diode D3 is turned on such that the interruption signal $S_{PDP}$ is at the low level.

Additionally, the energy adjustor 100 can operate between different control modes. In this embodiment, the energy adjustor 100 operates in a voltage control mode, a current control mode, a power control mode or a power follow mode. Four Proportional Integral Derivatire (PID) controllers are utilized to smoothly switch the energy adjustor 100 between different control modes.

In this embodiment, when the energy adjustor 100 operates in a voltage control mode, a current control mode or a power control mode, the control module 101 compares a setting signal $S_{SET}$ with a real level and generates the control signals VT1 and VT2 according to the compared result such that the real level is equal to the setting signal $S_{SET}$. The real level relates to at least one of the output voltage $V_{FC}$ of the fuel cell group 110 and the output current Iin of the fuel cell group 110.

In one embodiment, the real level relates to the output voltage $V_{FC}$, the output current Iin or the output power of the fuel cell group 110. Taking the output voltage $V_{FC}$ of the fuel cell group 110 as an example, the control module 101 compares the setting signal $S_{SET}$ with the output voltage $V_{FC}$ of the fuel cell group 110 to generate a compared result. The control module 101 controls the boost regulation module 102 and the drop regulation module 103 according to the compared result such that the output voltage $V_{FC}$ of the fuel cell group 110 is equal to the setting signal $S_{SET}$.

Figure 6:
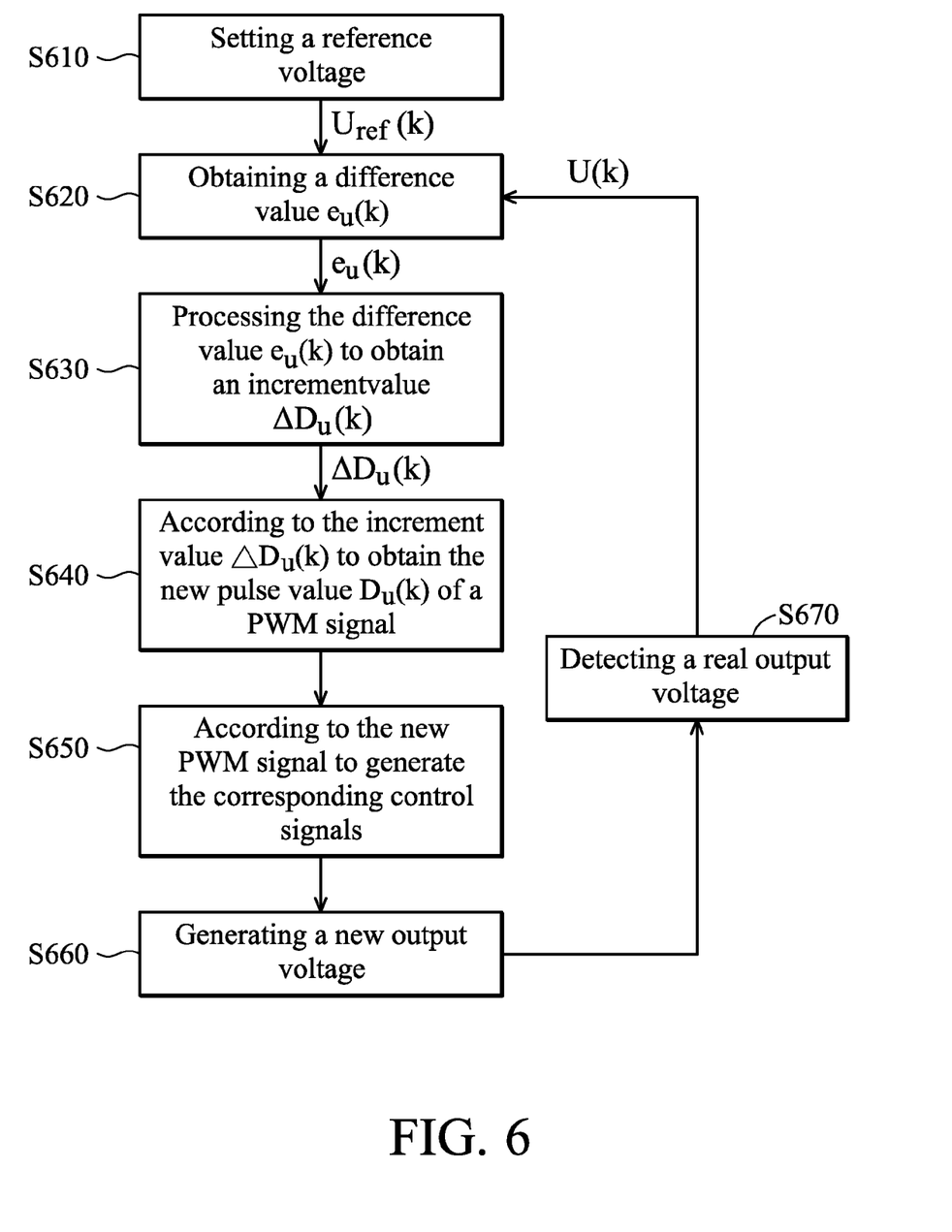
FIG. 6 is a schematic diagram of an exemplary embodiment of the voltage control mode.

FIG. 6 is a schematic diagram of an exemplary embodiment of the voltage control mode. In the voltage control mode, the control module 101 simultaneously controls the boost regulation module 102 and the drop regulation module 103 according to the setting signal $S_{SET}$ such that the adjustment voltage $V_{A2}$ is equal to the setting signal $S_{SET}$. Since the adjustment voltage $V_{A2}$ relates to the output voltage of the fuel cell group 110, the output voltage of the fuel cell group 110 can be set to equal to a user indicative voltage according to the setting signal $S_{SET}$.

First, a reference voltage is set (step S610). In one embodiment, a CAN bus is utilized to receive a setting signal $S_{SET}$. The setting signal $S_{SET}$ is an indicative voltage sent by a user. In this embodiment, the indicative voltage sent by the user is served as a reference voltage $U_{ref}(k)$.

Next, the reference voltage $U_{ref}(k)$ is compared with a real level to obtain a difference value $e_u(k)$ (step S620). In one embodiment, the real level relates to the output voltage of the fuel cell group 110. In this embodiment, the adjustment voltage $V_{A2}$ output from the energy adjustor 100 is served as the real level U(k). The difference value $e_u(k)=U(k)-U_{ref}(k)$.

The difference value $e_u(k)$ is processed to obtain at least one increment value $\Delta D_u(k)$ (step S630). In one embodiment, two increment values are obtained according to the difference value $e_u(k)$. Since the generations of the two increment values are the same, the generation of one increment value is given as an example. In this embodiment, a voltage PID controller is utilized to process the difference value $e_u(k)$ to obtain an increment value $\Delta D_u(k)$ of a PWM signal. In one embodiment, the increment value $\Delta D_u(k)$ is expressed as:

$$\Delta D_u(k)=k_{up}[e_u(k)-e_u(k-1)]+k_{ui}e_u(k)+k_{ud}[e_u(k)-2e_u(k-1)+e_u(k-2)]$$

wherein $e_u(k-1)$ is a previous difference value before the current difference value $e_u(k)$, $e_u(k-2)$ is a previous second difference value before the current difference value $e_u(k)$, $k_{up}$ is a proportional constant, $k_{ui}$ is a integral constant, $k_{ud}$ is a derivatire constant, $k_{up}$ $k_{ui}$ and $k_{ud}$ are obtained according to a simulation calculation and a real test and are not unvalued, and $k_{up}$ $k_{ui}$ and $k_{ud}$ are changed according to an input voltage.

A new pulse value $D_u(k)$ is obtained according to the increment value $\Delta D_u(k)$ (step S640). In one embodiment, when the output voltage of the fuel cell group 110 is controlled by a PWM signal, the increment value $\Delta D_u(k)$ is calculated to obtain a new pulse value $D_u(k)$ of the PWM signal. In this embodiment, the PWM unit 415 obtains the new pulse value $D_u(k)$ of the PWM signal according to the increment value $\Delta D_u(k)$. In one embodiment, $D_u(k)=\Delta D_u(k)+D_u(k-1)$. In other embodiments, if two increment values are obtained according to the difference value $e_u(k)$, two new PWM signals can be obtained according to the two increment values.

A corresponding control signal is generated according to the new PWM signal (step S650). In this embodiment, a driving circuit is utilized to generate the corresponding control signal. For example, the driving circuit 430 shown in FIG. 2 generates the control signals VT1 and VT2 according to a new PWM signal generated by the micro-controller 410.

A new output voltage is generated according to the control signals (step S660). In this embodiment, the driving circuit 430 generates the corresponding control signals VT1 and VT2 according to the new PWM signal. Thus, the boost regulation module 102 and the drop regulation module 103 are simultaneously controlled to generate new output voltage (e.g. the adjustment voltage $V_{A2}$).

The real output voltage is detected (step S670) and the real output voltage is compared with the reference voltage $U_{ref}(k)$ until the real output voltage is equal to the reference voltage $U_{ref}(k)$.

Figure 7:
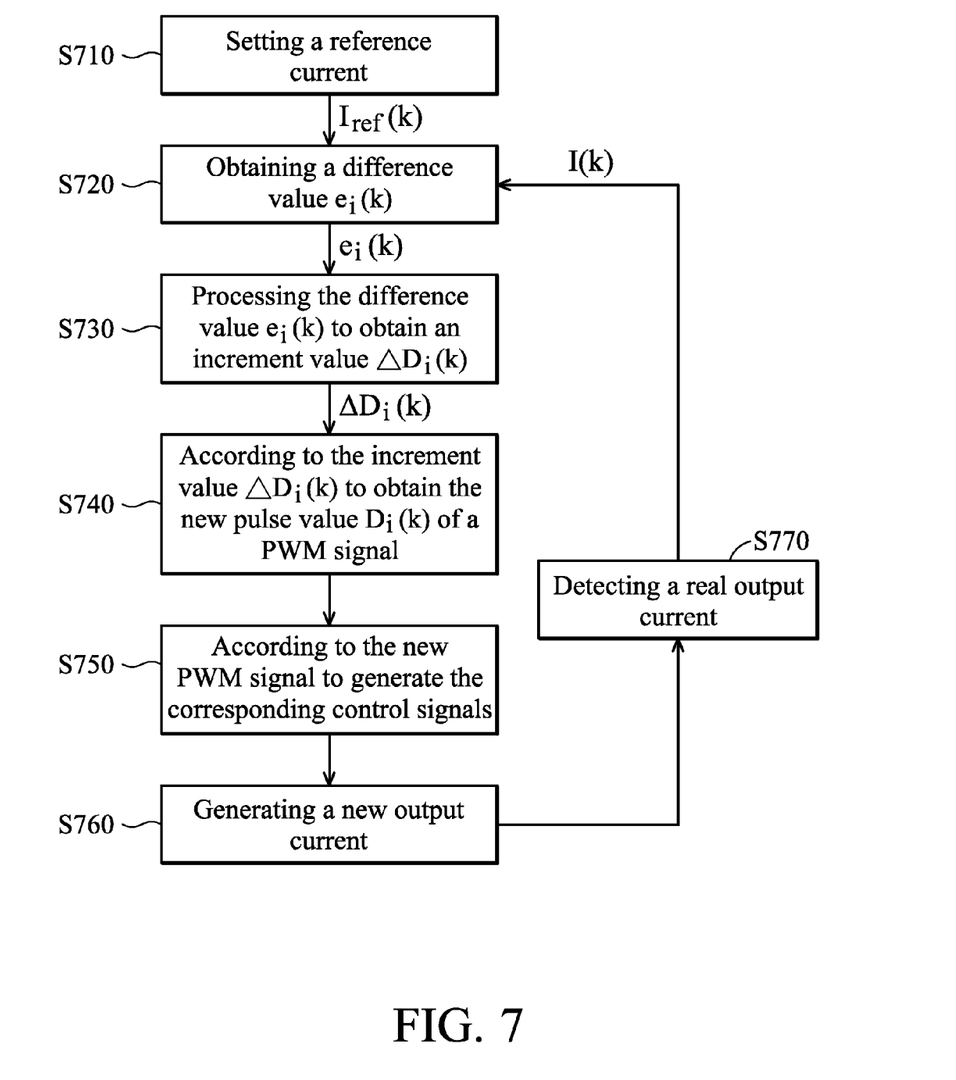
FIG. 7 is a schematic diagram of an exemplary embodiment of the current control mode.

FIG. 7 is a schematic diagram of an exemplary embodiment of the current control mode. Since the output current Iout of the energy adjustor 100 relates to the output current of the fuel cell group 110, the output current of the fuel cell group 110 can be set to equal to a user indicative current according to a setting signal $S_{SET}$.

For example, in a current control mode, the control module 101 receives a user indicative current via a CAN bus and simultaneously controls the boost regulation module 102 and the drop regulation module 103 such that the output current Iout of the fuel cell group 110 is equal to the user indicative current. In this embodiment, when the energy adjustor 100 operates in the current control mode, the output voltage of the energy adjustor 100 is the voltage of the secondary battery group. Thus, the energy adjustor 100 does not control the output voltage of the fuel cell group 110. The energy adjustor 100 only controls the output current of the fuel cell group 110.

The operating procedure of the current control mode is described in greater detail with reference to FIG. 7. First, a reference current is set (step S710). In this embodiment, an indicative voltage sent by a user is served as a reference current $I_{ref}(k)$. Next, the reference current $I_{ref}(k)$ is compared with a real level to obtain a difference value $e_i(k)$ (step S720). In this embodiment, the output current Iout output from the energy adjustor 100 is served as the real level I(k). The difference value $e_i(k)=I(k)-I_{ref}(k)$.

The difference value $e_i(k)$ is processed to obtain an increment value $\Delta D_i(k)$ (step S730). In this embodiment, a current PID controller is utilized to process the difference value $e_i(k)$ to obtain an increment value $\Delta D_i(k)$ of a PWM signal. For example, if the output current of the fuel cell group is controlled according to a PWM signal, the increment value $\Delta D_i(k)$ of step S730 is a change amount of the PWM signal.

In one embodiment, the increment value $\Delta D_i(k)$ is expressed as:

$$\Delta D_i(k)=k_{ip}[e_i(k)-e_i(k-1)]+k_{ii}e_i(k)+k_{id}[e_i(k)-2e_i(k-1)+e_i(k-2)]$$

wherein $e_i(k-1)$ is a previous difference value before the current difference value $e_i(k)$, $e_i(k-2)$ is a previous second difference value before the current difference value $e_i(k)$, $k_{ip}$ is a proportional constant, $k_{ii}$ is an integral constant, $k_{id}$ is a derivatire constant, $k_{ip}$ $k_{ii}$ and $k_{id}$ are obtained according to a simulation calculation and a real test and are not unvalued, and $k_{ip}$ $k_{ii}$ and $k_{id}$ are changed according to an input voltage.

A new pulse value $D_i(k)$ is obtained according to the increment value $\Delta D_i(k)$ (step S740). In this embodiment, the micro-controller 410 obtains the new pulse value $D_i(k)$ of the PWM signal according to the increment value $\Delta D_i(k)$. In one embodiment, $D_u(k)=\Delta D_u(k)+D_u(k-1)$.

A corresponding control signal is generated according to the new PWM signal (step S750). In this embodiment, a driving circuit is utilized to generate the corresponding control signal. For example, the driving circuit 430 shown in FIG. 2 generates the corresponding control signal according to a new PWM signal generated by the micro-controller 410.

A new output current is generated according to the control signals (step S760). In this embodiment, the driving circuit 430 generates the corresponding control signals VT1 and VT2 according to the new PWM signal. Thus, the boost regulation module 102 and the drop regulation module 103 are simultaneously controlled to generate new output current.

The real output current is detected (step S770) and the real output current is compared with the reference current $I_{ref}(k)$ until the real output current is equal to the reference current $I_{ref}(k)$. In other words, the output voltage of the fuel cell group is finally equal to a user indicative current.

Figure 8:
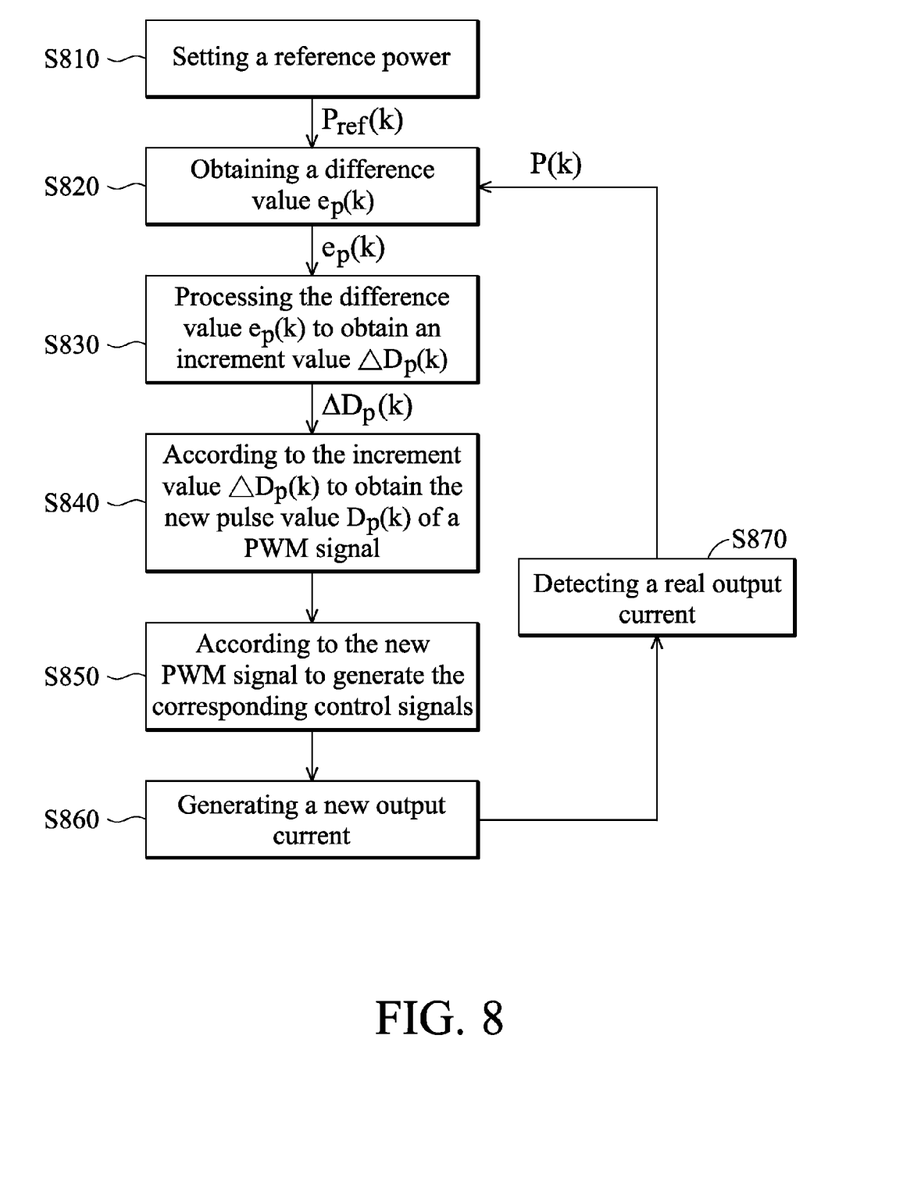
FIG. 8 is a schematic diagram of an exemplary embodiment of the power control mode.

FIG. 8 is a schematic diagram of an exemplary embodiment of the power control mode. Since the output power of the energy adjustor 100 relates to the power of the fuel cell group 110, the power of the fuel cell group 110 can be set to equal to a user indicative power according to a setting signal $S_{SET}$.

For example, during a power control mode, the control module 101 receives a user instruction (e.g. a setting signal $S_{SET}$) via a CAN bus. Then, the control module 101 controls the boost regulation module 102 and the drop regulation module 103 such that the power of the fuel cell group 110 is set to equal to a user indicative power.

In one embodiment, if the power of the fuel cell group 110 is not enough to drive the load 150, the secondary battery group 130 assists the fuel cell group 110 in driving the load 150. If the power of the fuel cell group 110 exceeds the power required by the load 150, the fuel cell group 110 not only drives the load 150, but also charges the secondary battery group 130.

First, a reference power is set (step S810). In this embodiment, the indicative power sent by the user is served as a reference power $P_{ref}(k)$. Then, the reference power $P_{ref}(k)$ is compared with a real level provided by the energy adjustor to obtain a difference value $e_p(k)$ (step S820). In this embodiment, the real level P(k) equals to the output current Iout of the energy adjustor 100 multiplied by the adjustment voltage $V_{A2}$. Thus, the difference value $e_p(k)=P(k)-P_{ref}(k)$.

The difference value $e_p(k)$ is processed to obtain at least one increment value $\Delta D_p(k)$ (step S830). In this embodiment, a power PID controller is utilized to process the difference value $e_p(k)$ to obtain an increment value $\Delta D_p(k)$ of a PWM signal.

A new pulse value $D_p(k)$ is obtained according to the increment value $\Delta D_p(k)$ (step S840). In this embodiment, the micro-controller 410 obtains the new pulse value $D_p(k)$ of the PWM signal according to the increment value $\Delta D_p(k)$. In one embodiment, $D_p(k)=\Delta D_p(k)+D_p(k-1)$.

A corresponding control signal is generated according to the new PWM signal (step S850). In this embodiment, a driving circuit is utilized to generate corresponding control signals. For example, the driving circuit 430 shown in FIG. 2 generates the control signals VT1 and VT2 according to a new PWM signal generated by the micro-controller 410.

A new output power is generated according to the control signals (step S860). In this embodiment, the driving circuit 430 generates the corresponding control signals VT1 and VT2 according to the new PWM signal. Thus, the boost regulation module 102 and the drop regulation module 103 are simultaneously controlled by the driving circuit 430 to generate new output power.

The real output power is detected (step S870) and the real output power is compared with the reference power $P_{ref}(k)$ until the real output power is equal to the reference power $P_{ref}(k)$. In one embodiment, when the reference power $P_{ref}(k)$ (i.e. a setting signal $S_{SET}$) is less than the output power of the fuel cell group 110 (i.e. a real output power P(k)), the control module 101 obtains the output power of the secondary battery group 130 such that the sum of the real output power of the fuel cell group 110 and the output power of the secondary battery group 130 is equal to the reference power $P_{ref}(k)$. When the reference power $P_{ref}(k)$ exceeds to the real output power P(k) of the fuel cell group 110, the control module 101 provides the difference between the real output power P(k) of the fuel cell group 110 and the reference power $P_{ref}(k)$ to the secondary battery group 130.

Figure 9:
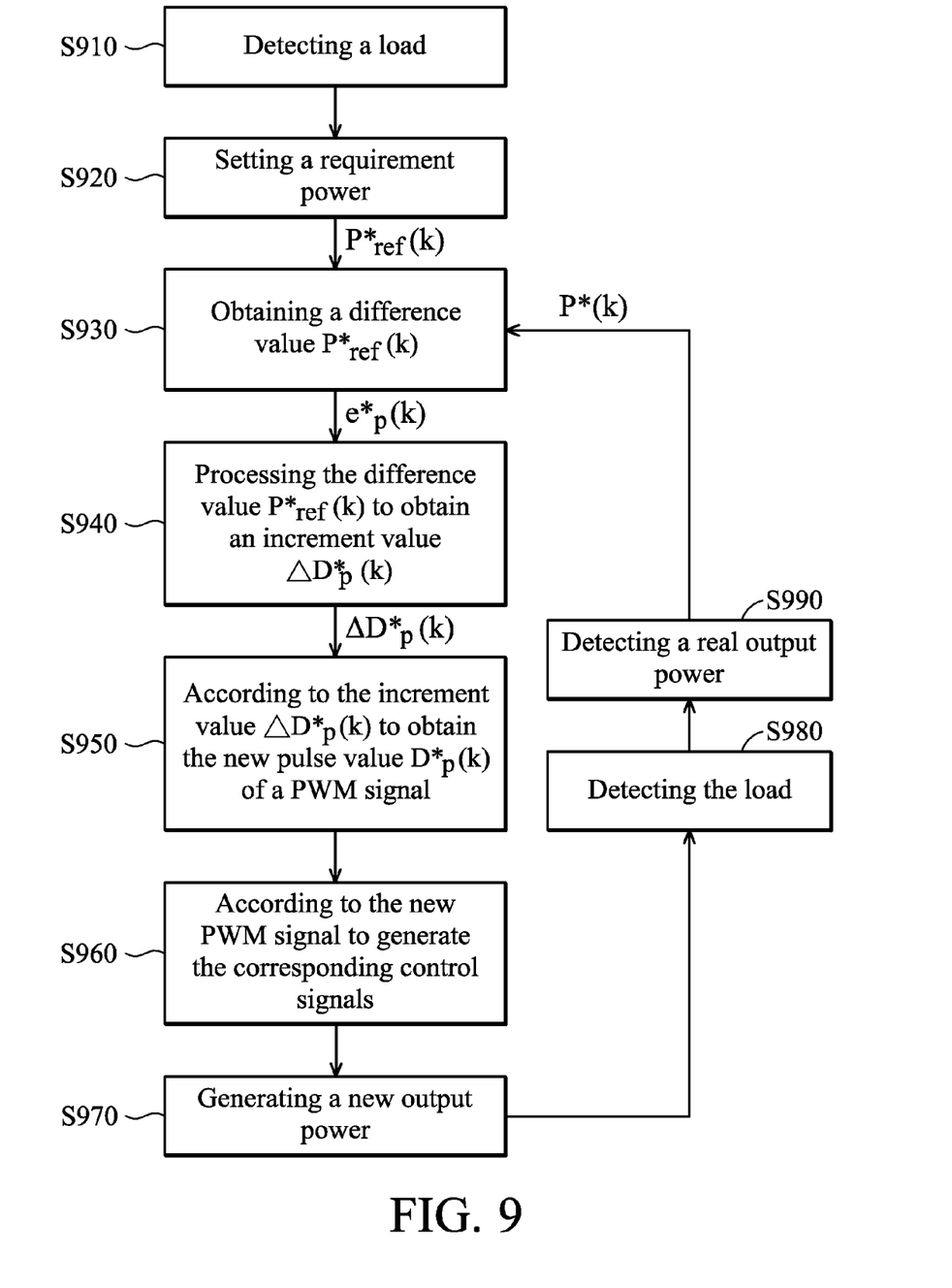
FIG. 9 is a schematic diagram of an exemplary embodiment of a power following mode.

FIG. 9 is a schematic diagram of an exemplary embodiment of a power following mode. During the power following mode, the energy adjustor 100 follows the requirement power required by the load 150 such that the output power of the fuel cell group 110 is equal to the requirement power required by the load 150. In one embodiment, the secondary battery group 130 is not charged and not discharged.

First, a requirement current and a requirement voltage required by the load are detected (step S910), and then a requirement power is obtained (step S920). In this embodiment, a close-loop PID controller with a feedback loop is utilized to calculate a multiplication of a current and a voltage. For example, a requirement power required by the load is the multiplication $P^*_{ref}(k)$ of a requirement current required by the load and a requirement voltage required by the load, and a feedback value is a multiplication $P^*(k)$ of the current and the voltage output from the energy adjustor 100. The multiplication $P^*_{ref}(k)$ serves as a power pre-determined value. In this embodiment, the multiplication $P^*_{ref}(k)$ is dynamically changed.

A difference value between the power pre-determined value $P^*_{ref}(k)$ and the feedback value $P^*(k)$ is calculated (step S930). In this embodiment, the difference value $e^*_p(k)=P^*(k)-P^*_{ref}(k)$. Then, the difference value $e^*_p(k)$ is processed to obtain at least one increment value $\Delta D^*_p(k)$ (step S840). In this embodiment, a power PID controller is utilized to process the difference value $e^*_p(k)$ to obtain an increment value $\Delta D^*_p(k)$ of a PWM signal.

A new pulse value $D^*_p(k)$ is obtained according to the increment value $\Delta D^*_p(k)$ (step S950). In one embodiment, a micro-control unit (MCU) obtains the new pulse value $D^*_p(k)$ of the PWM signal according to the increment value $\Delta D^*_p(k)$. For example, $D^*_p(k)=\Delta D^*_p(k)+D^*_p(k-1)$.

A new output power is generated according to the control signals (step S960). Thus, the boost regulation module 102 and the drop regulation module 103 are simultaneously controlled such that the output power of the energy adjustor 100 follows the power required by the load 150. In this embodiment, the output current and power of the energy adjustor 100 are detected (step S980) and then the real output power $P^*(k)$ of the energy adjustor 100 is obtained according to the detection results (step S990). The real output power $P^*(k)$ of the energy adjustor 100 is compared with the power pre-determined value $P^*_{ref}(k)$ until the real output power of the energy adjustor 100 is equal to the power pre-determined value $P^*_{ref}(k)$. In other words, the power output from the fuel cell group is equal to the power required by the load.

During the changing of the modes, the control signals are gradually increased or reduced. Thus, the change between the four modes is smooth. Additionally, if the control module 101 utilizes a soft-start to perform mathematical calculations and simultaneously controls the boost regulation module 102 and the drop regulation module 103 to perform a turn-on operation and change mode, the control signals VT1 and VT2 provided to the boost regulation module 102 and the drop regulation module 103 are gradually increased or reduced. Thus, the output of the fuel cell group 110 is gradually changed to avoid mutations of the voltage and the current of the fuel cell group 110.

The peripheral unit 440 is a module to diagnose fault and notify a fault state and comprises a buzzer 442, a data display (e.g. LED) 443, and an external computer 444. The peripheral unit 440 can immediately operate according to the voltages, currents and the temperatures detected by the control module 101. In addition, the peripheral unit 440 can transmit the detected result to a remote terminal via an RS-485 interface, or transmit the detected result to the external computer 444 via an RS-485/RS-232 converter.

Since the control module 101 and the external computer 444 can immediately diagnose an abnormal event, such as an insufficient voltage event, a surfeit of voltage event, a surfeit of current event, a surfeit of temperature event and a detector fault event, when one element has a fault, a protection function can be executed to limit the output power of the fuel cell group. Additionally, the data display can display a corresponding fault code, and the buzzer can issue voice to warn a user. The external computer 44 can display the fault code and the corresponding position of the fault element.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An energy adjustor coupled between a fuel cell group and a secondary battery group, wherein a load is coupled to the secondary battery group in parallel, comprising:
   a boost regulation module boosting an output voltage of the fuel cell group to generate a first adjustment voltage according to a first control signal;
   a drop regulation module dropping the first adjustment voltage to generate a second adjustment voltage to the load according to a second control signal;
   a detecting module detecting at least one of the fuel cell group, the boost regulation module, the drop regulation module and the load to generate a detection result; and
   a control module generating the first and the second control signals according to the detection result,
   wherein the boost regulation module comprises a first input terminal, a second input terminal, a first output terminal and a second output terminal, wherein the first input terminal is coupled to a first positive pole of the fuel cell group, and the second input terminal is coupled to the first negative pole of the fuel cell group;
   wherein the drop regulation module comprises a third input terminal, a fourth input terminal, a third output terminal and a fourth output terminal, wherein the third input terminal is coupled to the first output terminal, the fourth input terminal is coupled to the second output terminal, the third output terminal is coupled to a second positive pole of the load, and the fourth output terminal is coupled to a second negative pole of the load,
   wherein the boost regulation module further comprises:
      a first inductor coupled to the first positive pole of the fuel cell group;
      a first diode coupled between the first inductor and the first output terminal;
      a first insulated gate bipolar transistor (IGBT) comprising a gate receiving the first control signal, a collector coupled to an anode of the diode and a emitter coupled to the first negative pole; and
      a first capacitor coupled between the first and the second output terminals,
   wherein the drop regulation module further comprises:
      a second IGBT comprising a gate receiving the second control signal, a collector coupled to the third input terminal and a emitter;
      a second inductor coupled between the emitter of the second IGBT and the third output terminal;
      a second diode coupled between the second inductor and the fourth input terminal; and
      a second capacitor coupled between the third and the fourth output terminals,
   wherein the detecting module comprises:
      a first current detector coupled to the first positive pole and detecting a current of the fuel cell group;
      a first voltage detector coupled between the first positive pole and the first negative pole and detecting the voltage of the fuel cell group;
      a second current detector coupled to the third output terminal and detecting a current of the third output terminal;
      a second voltage detector coupled between the third and the fourth output terminals and detecting the second adjustment voltage;
      a third current detector coupled to the second positive pole and detecting a current of the load;
      a first temperature unit detecting the boost regulation module; and
      a second temperature unit detecting the drop regulation module,
   wherein the control module comprises:
      a sample circuit sampling the detection results of the first, the second and the third current detectors, the first and the second voltage detectors, and the first and the second temperature detecting units;
      a micro-controller generating a first pulse width modulation (PWM) signal and a second PWM signal according to a sampling result provided by the sample circuit; and
      a driving circuit generating the first and the second control signals according to the first and the second PWM signals, and
   wherein the micro-controller comprises:
      a serial peripheral interface (SPI) receiving the sampling result provided by the sample circuit;
      a controller area network (CAN) receiving a setting signal;
      a PWM unit generating the first and the second PWM signals according to information received by the SPI and the CAN;
      an input/output unit driving a fan, a buzzer and a data display according to the information received by the SPI; and
      a serial communications interface (SCI) unit receiving information provided by an external computer or providing information to the external computer.

2. The energy adjustor as claimed in claim 1, wherein the control module compares the setting signal and a real level to generate a compared result, and the control module generates the first and the second control signals according to the compared result such that the real level is equal to the setting signal, wherein the real level relates to at least one of the voltage and the current of the fuel cell group.

3. The energy adjustor as claimed in claim 2, wherein if the real level is a power of the fuel cell group, the control module compares the setting signal with a power of the fuel cell group, and
   when the setting signal is less than the power of the fuel cell group, the control module assembles a power of the secondary battery group and the power of the fuel cell group such that the sum of the power of the secondary battery group and the power of the fuel cell group is equal to the setting signal, and
   when the setting signal exceeds the power of the fuel cell group, the control module obtain a difference value between the power of the fuel cell group and the setting signal and provides the difference value to the secondary battery group.

4. The energy adjustor as claimed in claim 2, wherein the control module generates the first and the second control signals according to a requirement power required by the load such that a power of the fuel cell group is equal to the requirement power.

5. The energy adjustor as claimed in claim 1, wherein the control module comprises:
   a first optoelectronic isolator coupled to the input/output unit;
   a relay coupled between the first optoelectronic isolator and the fan;
   a second optoelectronic isolator coupled to the input/output unit;
   a driver coupled between the second optoelectronic isolator and the buzzer;

a third optoelectronic isolator coupled between the input/output unit and the data display;

a fourth optoelectronic isolator coupled to the SCI unit; and a signal receiver/emitter coupled between the fourth optoelectronic isolator and the external computer, wherein the signal receiver/emitter is an RS-485 receiver/emitter or an RS-232 receiver/emitter.

6. The energy adjustor as claimed in claim 5, wherein the driving circuit comprises:

an inverting driver processing the first and the second PWM signals to generate a first inverting signal and a second inverting signal;

a level shifter transforming levels of the first and the second inverting signals; and a switch driver generating the first and the second control signals according to an output of the level shifter to determine whether the first or the second IGBT is abnormal.

* * * * *